May 25, 1954 — P. HARTMANN — 2,679,306
HYDRAULIC COUPLING
Filed Feb. 1, 1952 — 3 Sheets-Sheet 2

INVENTOR.
Philip Hartmann
BY Quarles & French
Att'ys.

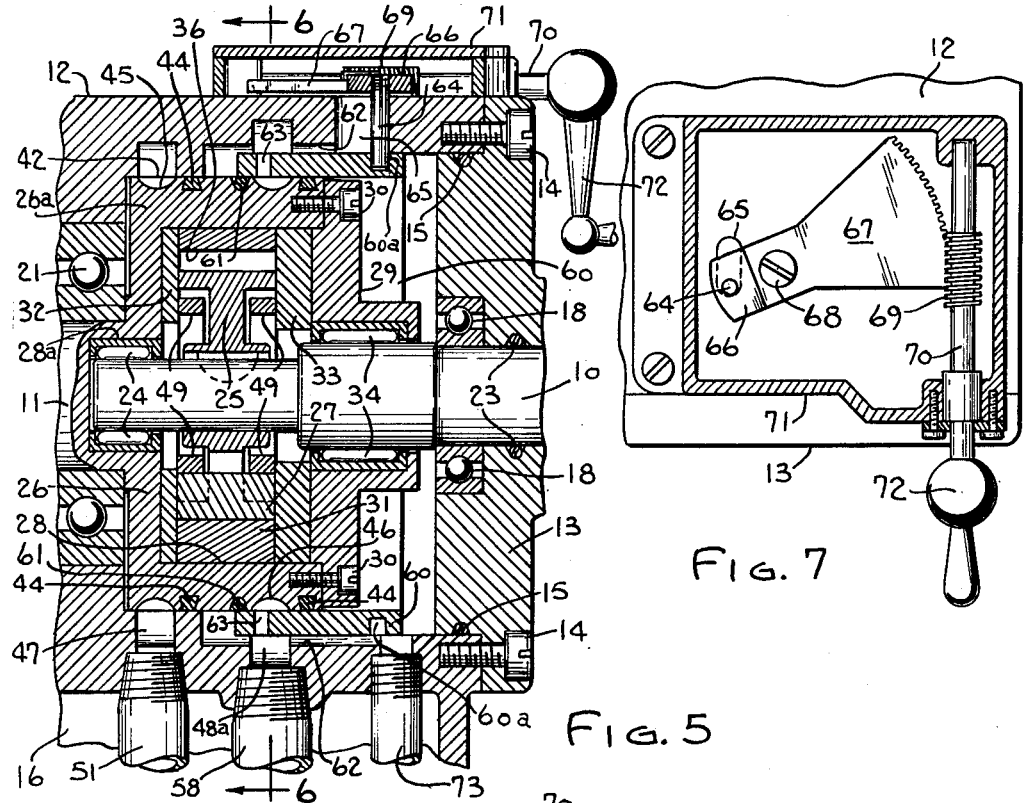
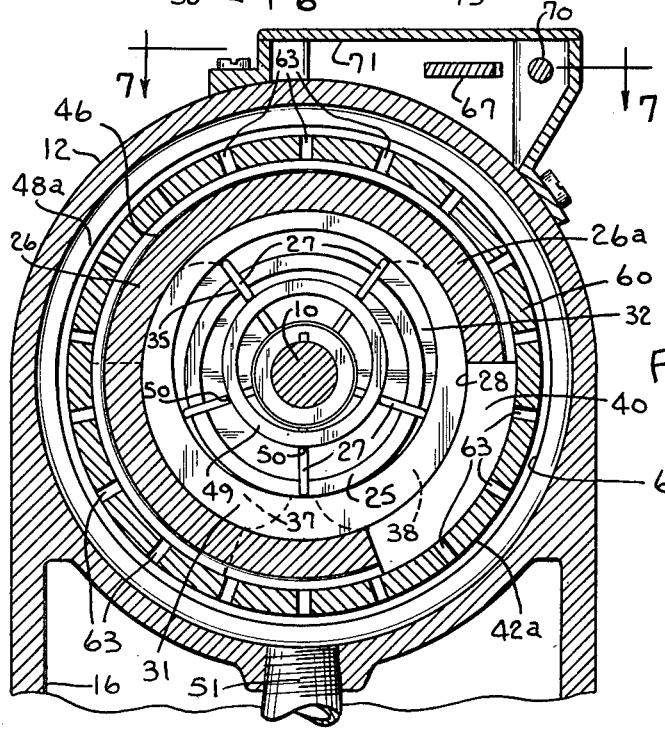

Patented May 25, 1954

2,679,306

UNITED STATES PATENT OFFICE 2,679,306

HYDRAULIC COUPLING

Philip Hartmann, Racine, Wis., assignor to Hartmann Manufacturing Company, Racine, Wis., a corporation of Wisconsin Application February 1, 1952, Serial No. 269,489

5 Claims. (Cl. 192—58)

The invention relates to a variable speed hydraulic coupling or clutch between a drive shaft and a driven shaft.

The main object of the invention is to provide a variable speed hydraulic coupling or clutch between a drive shaft and a driven shaft in which the coupling means is a vane type pump whose rotor is driven by said drive shaft and whose housing is mounted on said driven shaft, said pump having an adjustable outlet whereby the speed of the driven shaft may be varied relative to that of the drive shaft.

The invention further consists in the several features hereinafter set forth and more particularly defined by claims at the conclusion hereof.

In the drawings:

Fig. 5 is a view similar to Fig. 1, showing certain modifications, parts being broken away;

Fig. 6 is a detailed vertical sectional view taken on the line 6—6 of Fig. 5;

Fig. 7 is a detailed horizontal sectional view taken on the line 7—7 of Fig. 6;

Figures 1, 2:
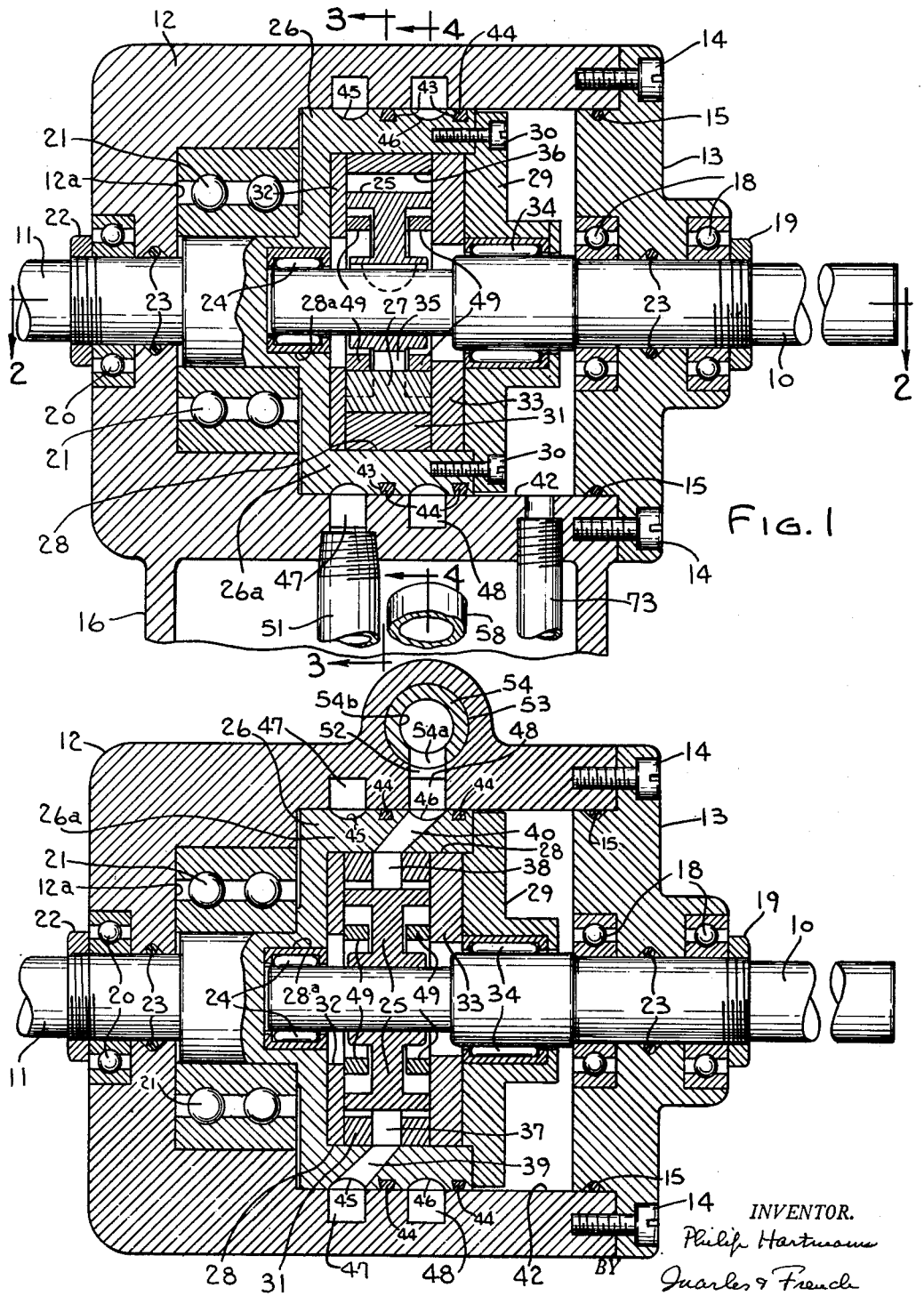
Fig. 1 is a vertical sectional view through a coupling embodying the invention.
Fig. 2 is a detailed horizontal sectional view taken on the line 2—2 of Fig. 1.

Referring to Figs. 1 and 2, the numeral 10 designates a drive shaft and 11 a driven shaft which are connected together by my improved coupling. These shafts are mounted in axial alinement in a housing including a main part 12 and an end plate 13 secured to the part 12 by screws 14 and having an oil-tight connection therewith provided by a packing or O-ring 15, the main part 12 having a base portion 16 for mounting on one end of a sump tank 17.

The drive shaft 10 is mounted in spaced sets of ball bearing journals 18 mounted in the end plate 13 and is provided with an adjustable thrust collar 19 engageable with the outer journal to limit inward end movement of said shaft. The driven shaft 11 is mounted in ball bearing journals 20 and 21 mounted in the housing part 12 and is provided with an adjustable thrust collar 22 engageable with the outer journal 20 to limit inward end movement of said shaft. Each shaft 10 and 11 is sealed against oil flow by a rubber O-ring 23. The drive shaft 10 has an outboard bearing provided by a needle bearing 24 mounted in the recessed adjoining end of the shaft 11.

The shafts 10 and 11 are adapted to be coupled together by a vane type hydraulic pump whose rotor 25 is keyed to the shaft 10 and whose housing 26 is mounted on the driven shaft 11. The vane type pump may be of any suitable construction but for best results should be of the type in which the vanes 27 are positively held in an operative position as distinguished from those pumps in which fluid pressure acts on the vanes for this purpose.

The vane type pump shown is that shown and described in detail in my copending application Serial No. 215,110, filed March 12, 1951, now Patent No. 2,623,471, for Vane Type Pump or Motor, and in which the working chamber is formed by the housing 26 which includes the cup-shaped end 26a of the driven shaft having concentric bores 28 and 28a, axially alined with the shafts 10 and 11, an end plate 29 secured to the front end of the cup by screws 30, a liner member 31 fitting in the bore 28, and annular end liner plates 32 and 33 mounted in the bore 28 on opposite sides of said liner 31 and clamped with said liner in the cup by said end plate 29 which has a hub portion carrying a needle bearing 34 for the drive shaft 10.

The rotor 25 is preferably of T-shaped section and is axially alined with shaft 10 and provided with a series of radially disposed vane slots 35 and works between the end liner plates 32 and 33.

The peripheral wall liner 31 of the housing is provided with a bore 36 which is eccentric to the shaft 10, the outer diameter of the rotor 25 and the bore 28 and has oppositely disposed radially disposed slots or ports 37 and 38 communicating with radially disposed ports 39 and 40 in part 26a and equidistantly disposed relative to the axis of the rotor 35. The ports 37 and 38 are centrally located relative to the sides of the member 31 and are of less width than said member, and there is preferably only a short bridge 41 between these ports. The inner race of the bearing 21 abuts the base or back of the cupped end 26a and also has a running fit with the end wall 12a of the housing to check outward end movement of the housing 26 and shaft 11. The outer peripheral wall of the cup 26a has a close running fit with a bore 42 in the fixed housing part 12 and is also provided with spaced dove-tailed or tapered wall annular grooves 43 whose bases are wider than their tops. Each of these grooves is filled with a suitable bearing metal, such as babbit, which is melted or sweated into the groove so as to produce a solid ring 44 whose periphery is then machined off so that it may be just squeezed into the bore 42 and then the shaft 11 is rotated to run in these rings 44 so that they have an extremely close running fit with the bore 42.

The cup or recessed housing part 26a of the shaft 11 has spaced peripheral grooves 45 and 46 which are alined with annular grooves or channels 47 and 48 extending into the bore 42. The port 39 connects with the groove 45, and the port 40 with the groove 46.

A series of vanes 27 are mounted to slide in slots 35 of the rotor 25, the length of these vanes being equal to the width of the rotor. These vanes are held in operative position relative to the liner bore 36 by a pair of floating metal rings 49 which bear on the rounded back edges 50 of the vanes, said rings being positioned adjacent each side of the web of the T-section of the rotor, as shown in Fig. 1, and serving to cause the vanes to move in a circular path relative to the bore 36 while moving with the rotor and lengthwise of the slots 35 in the same.

A hydraulic fluid intake pipe or conduit 51 leads from the groove 47 into the sump tank 17 at the end upon which the housing part 12 is mounted.

In Figs. 1 to 4 the groove 48 connects through port 52 with a bore 53 in which a piston valve 54 is rotatably mounted, the upper end of bore 53 being sealed by a rubber O-ring 55 and the exposed end of the valve carrying the operating handle 56. The valve 54 has a port 54a movable into register with the port 52 and connected with a bore 54b open at its lower end. The lower end of the bore 53 connects with a passage 57 which is connected with a waste or exhaust pipe or conduit 58 which extends down into the sump tank 17 and thence lengthwise to a point of discharge at the opposite end of said tank from that of the pipe 51 so that agitation of the fluid in the tank will occur at this end of the tank. The tank may be provided with any suitable means for cooling the hydraulic working fluid therein, and a cooling coil 59 has been indicated for this purpose.

The valve 54 is a throttling valve, and other forms of valve may be used for this purpose, one of which is shown in Figs. 5 to 7 in which the valve 60 is a sleeve valve formed as a sleeve or tube free to rotate with the housing 26a and working between the peripheral portion of the housing 26a and a counterbore 62. A rubber O-ring 61 mounted in an annular groove in the part 26a acts as a valve seal. The sleeve 60 has a series of radially disposed outlets 63 which are movable relative to the groove 46 and the channel 48 to restrict or enlarge the flow area between said groove and channel. The sleeve 60 may be reciprocated or lengthwise adjusted relative to the groove 46 and channel 48 in any suitable manner, and for this purpose I have shown said sleeve as provided with an annular groove 60a in which a radially disposed pin 64 works. Pin 64 works in a slot 65 and is secured at its outer end to one end 66 of a segmental gear 67 journalled on a pivot post 68 and meshing with a worm 69 formed on a shaft 70 journalled in an auxiliary housing 71 secured to the upper portion of the housing part 12, said shaft having an exteriorly disposed hand crank 72.

Figure 3:
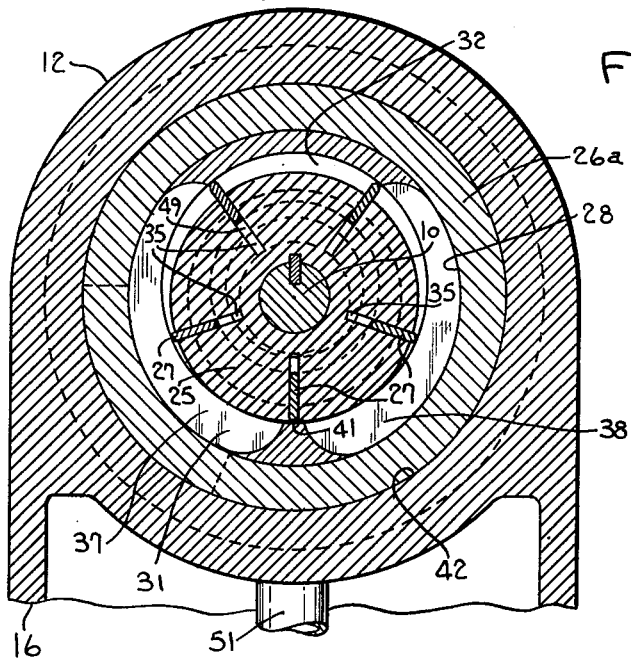
Fig. 3 is a detailed vertical sectional view taken on the line 3—3 of Fig. 1.
Figure 8:
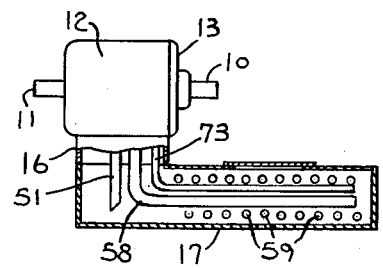
Fig. 8 is an end elevation view of the coupling with its sump tank shown in section.
Figure 4:
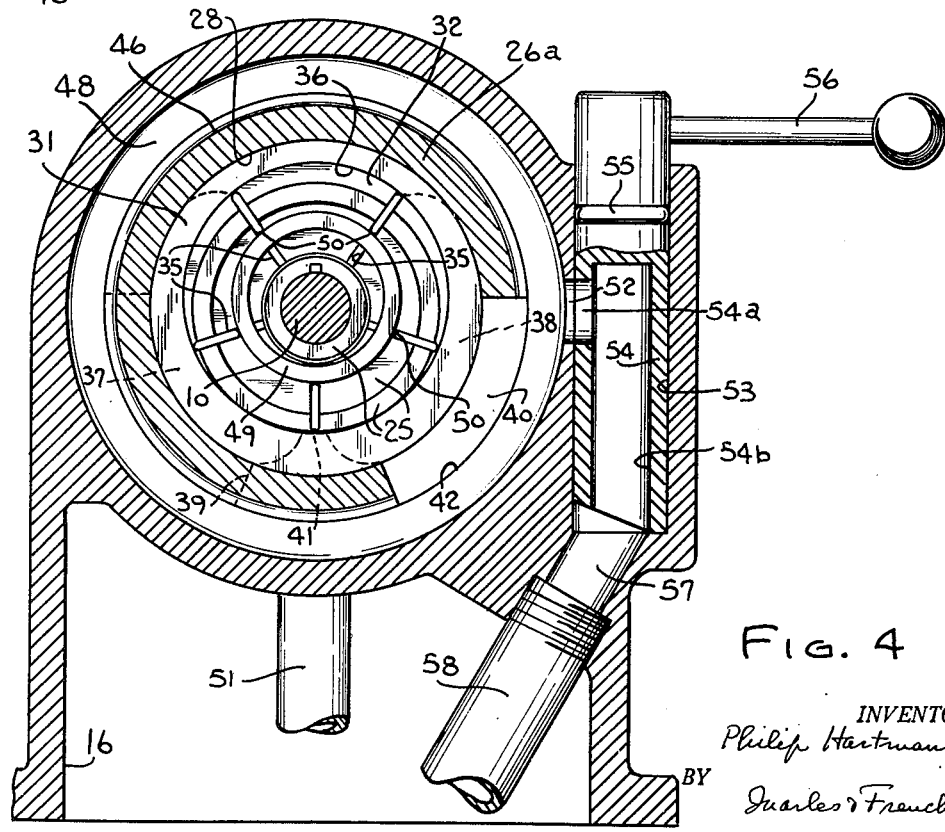
Fig. 4 is a detailed vertical sectional view taken on the line 4—4 of Fig. 1.

The other parts of the structure shown in Figs. 5 and 6 are similar to those shown in Figs. 1 to 3 and are similarly numbered.

Any oil seepage from the various parts that may find its way to the bottom of the bore 42 or 62 of the housing is led off through a drain pipe 73. The valves 54 and 60 may be governor operated, if desired.

With the above constructions the shaft 10 is driven by either an electric motor or other suitable prime mover and turns the rotor 25 which carries the vanes 27 around in the pump housing so that they act to suck hydraulic fluid from the tank 17 through the inlet pipe 51, the groove 47 and the ports 39 and 37 into the working chamber of the pump formed by the liner members 31, 32, and 33. In the construction shown in Figs. 1 to 4 when the valve 54 is in open position, the fluid sucked into the pump is delivered out of the pump through the registering ports 38 and 48 to the port 52 and through the port 54a and passage 54b in the valve 54 to the passage 57 and to the waste pipe 58 and thence to the sump tank so that the fluid merely circulates from the tank through the pump. If now the valve 54 is turned so as to partially restrict its communicating opening with the port 52 to thereby throttle the return flow of the hydraulic fluid, a driving pressure is set up between the fluid in the pump housing and the housing of the pump which, as previously noted, forms a part of the driven shaft 11 and consequently the driven shaft is driven but at a reduced speed from that of the drive shaft 10. If, however, the valve 54 is closed, then the pump acts through the liquid as a substantially solid drive connection between the shafts 10 and 11, and the shaft 11 rotates at substantially the same speed as the drive shaft. Thus on the throttling position of the valve 54 will depend the speed at which the shaft 11 rotates relative to the shaft 10, there being more slippage in the drive between these two shafts through the pump the more the valve 54 is open. A similar action takes place when the sleeve 60 is moved relative to the housing parts 12 and 26a, though it will be noted that in this case the hydraulic fluid passes from the groove 46 through the ports 63 to the annular groove 48a connected with the exhaust pipe 51.

I desire it to be understood that this invention is not to be limited to any particular form or arrangement of parts except in so far as such limitations are included in the appended claims.

What I claim as my invention is:

1. A hydraulic coupling comprising the combination of a driving shaft, a driven shaft alined with said drive shaft, a vane type hydraulic pump having its rotor connected to the drive shaft and its housing connected to the driven shaft, a fixed housing in which said shafts and said vane type pump are mounted for rotary movement, said fixed housing having a bore in which the peripheral portion of the pump housing has a running fit, an external cooled source of hydraulic fluid, an inlet connection from said source through said fixed housing to said pump housing, an outlet connection from said pump housing through said fixed housing to said source, said inlet and outlet connections including passages in the peripheral portion of said pump housing communicating with passages in said fixed housing connected with said bore, and means for varying the flow of fluid through said outlet connection to vary the speed of the driven shaft.

2. The coupling structure as defined in claim 1 wherein the means for varying the flow of fluid through said outlet connection is a rotatably adjustable piston valve.

3. The coupling structure as defined in claim 1 wherein the means for varying the flow of fluid through said outlet connection is an adjustable sliding sleeve valve mounted on the peripheral portion of said pump housing.

4. The hydraulic coupling as defined in claim 1 in which the peripheral portion of said pump housing has spaced annular grooves and bearing metal filling said grooves.

5. The hydraulic coupling as defined in claim 1 in which the peripheral portion of said pump housing has spaced dovetailed grooves, and a bearing metal filling for said grooves whose outer surface has a run in fit with said bore.

References Cited in the file of this patent

UNITED STATES PATENTS

| Number | Name | Date |
|---|---|---|
| 1,474,971 | Kramer | Nov. 20, 1923 |
| 2,195,901 | Owens | Apr. 2, 1940 |
| 2,581,172 | Carson | Jan. 1, 1952 |